US006451862B1

United States Patent
Kusaka et al.

(10) Patent No.: US 6,451,862 B1
(45) Date of Patent: Sep. 17, 2002

(54) PROCESS FOR PRODUCING A SPHERICAL SILICA GEL

(75) Inventors: Makoto Kusaka; Hachiro Hirano; Masaharu Tanaka; Hiroo Mori, all of Chiba (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/704,608

(22) Filed: Nov. 3, 2000

(30) Foreign Application Priority Data

Nov. 5, 1999 (JP) ............................................ 11-315621

(51) Int. Cl.[7] ........................ C01B 33/152; C01B 33/12
(52) U.S. Cl. ......................... 516/111; 516/98; 423/338
(58) Field of Search .................. 516/111, 98; 423/338, 423/339; 502/8

(56) References Cited

U.S. PATENT DOCUMENTS

| | | | |
|---|---|---|---|
| 2,492,808 A | * 12/1949 | Marisic et al. ............... | 516/111 |
| 2,645,619 A | * 7/1953 | Hoekstra ..................... | 516/111 |
| 2,897,159 A | * 7/1959 | Hoekstra et al. .............. | 502/8 |
| 4,528,149 A | * 7/1985 | Wichelhaus et al. .......... | 264/13 |
| 6,103,004 A | * 8/2000 | Belligoi et al. .............. | 516/111 |
| 6,267,942 B1 | * 7/2001 | Mori et al. .................. | 423/338 |

FOREIGN PATENT DOCUMENTS

| | | |
|---|---|---|
| DE | 253 243 | 1/1988 |
| EP | 0 067 459 | 12/1982 |

OTHER PUBLICATIONS

Database Derwent of East, week 198823, London: Derwent Publications, Ltd., AN 1988–155529, Class E36, DD 253243 A (Blaudszun et al) abstract.*
Database JPO on East, JPO200027291A, Oct. 3, 2000.*
Derwent Publications, AN 1978–09544A, JP 52 152875, Dec. 19, 1977, Week 197805.
Patent Abstracts of Japan, vol. 015, No. 450 (C–0885), Nov. 15, 1991, JP 03 193619, Aug. 23, 1991.
Derwent Publications, AN 1999–089988, JP 10 324517, Dec. 8, 1998, Week 199908.
Derwent Publications, AN 1985–113424, JP 60 054914, Mar. 29, 1985, Week 198519.

* cited by examiner

Primary Examiner—Daniel G. Metzmaier
(74) Attorney, Agent, or Firm—Oblon, Spivak, McClelland, Maier & Neustadt, P.C.

(57) ABSTRACT

A process for producing a spherical silica gel, which comprises supplying a liquid mixture of an alkali silicate solution and an acid solution to a spraying apparatus, spraying the liquid mixture to obtain droplets, bringing the droplets into contact with a liquid for recovering a silica gel, and recovering the formed spherical silica gel together with the liquid for recovering a silica gel, as a slurry.

8 Claims, 1 Drawing Sheet

PROCESS FOR PRODUCING A SPHERICAL SILICA GEL

FIELD OF THE INVENTION

The present invention relates to a process for producing a spherical silica gel.

DISCUSSION OF THE BACKGROUND

Spherical silica gels are widely used for a catalyst, a catalyst support, a filler for cosmetics, a medium for column chromatography, a resin filler, an adsorbent or a drying agent, from the viewpoint of varieties in the particle size, the pore structure and the surface physical properties. For such applications, solid particles having no depression or crack on the surface are preferred.

As a process for producing the spherical silica gel, an emulsification method has been known. JP-A-4-154605 discloses a method of emulsifying an aqueous sodium silicate solution or an alkyl silicate in a solvent having no compatibility therewith, followed by gelation with e.g. an acid, an alkali or water. Further, JP-B-4-2525 discloses a method of gelating an aqueous sodium silicate solution or an alkyl silicate with an acid, an alkali or water, followed by emulsification in a solvent having no compatibility therewith, for granulation.

By such emulsification methods, a gel of solid spherical silica particles having no depression can relatively easily be obtained. However, the emulsifying agent to be used is generally expensive, and accordingly the production cost of the spherical silica gel tends to be high.

Further, as a process for producing a spherical silica gel, a spray method also has been widely known. JP-A-61-168520, JP-A-7-138015 and JP-A-7-196310 disclose a method of spray-drying a silica sol to produce a spherical silica gel. JP-A-60-54914, JP-A-60-81012, JPA-3-223107, JP-B-4-68247 and JP-B-5-3413 disclose a method of spray-drying an alkali silica solution for gelation, followed by neutralization to produce a spherical silica gel.

With respect to the spherical silica gel obtainable by such a method, the particles tend to have a pore volume of at most about 0.6 cm$^3$/g in many cases, and it is difficult to control physical properties of the pores. Further, particles having part of their surfaces depressed are likely to form.

The present invention has been made to overcome the above problems, and it is an object of the present invention to provide a process for producing a solid spherical silica gel particles having no depression or crack, having a high particle strength, and having a sharp particle size distribution.

SUMMARY OF THE INVENTION

The present invention provides a process for producing a spherical silica gel, which comprises supplying a liquid mixture of an alkali silicate solution and an acid solution to a spraying apparatus, spraying the liquid mixture to obtain droplets, bringing the droplets into contact with a liquid for recovering a silica gel, and recovering the formed spherical silica gel together with the liquid for recovering a silica gel, as a slurry.

Now, the present invention will be described in detail with reference to the preferred embodiments.

DESCRIPTION OF THE PREFERRED EMBODIMENTS

Figure 1:
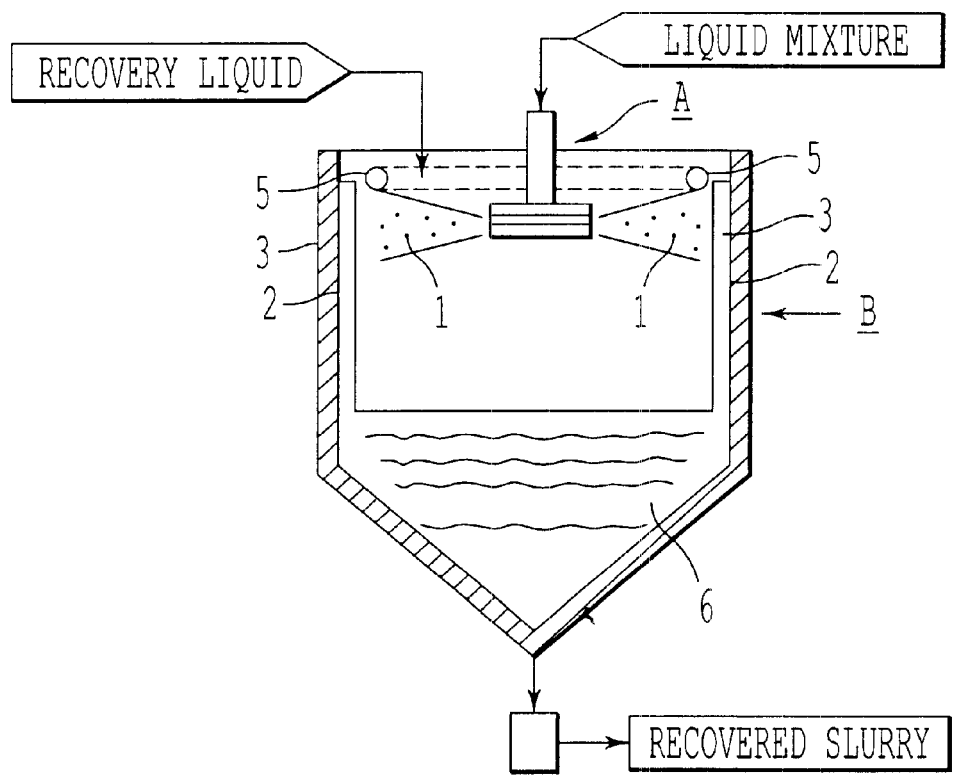
FIG. 1 is a cross section illustrating one example of a silica gel production apparatus to be used in the present invention.

In the present invention, a liquid mixture obtained by preliminarily mixing an alkali silica solution and an acid solution is supplied to a spraying apparatus. In a conventional process for producing a spherical silica gel by a spray granulation, a silica sol or an alkali silicate solution is sprayed to obtain droplets, and the droplets are heated for gelation. In such a case, the gelation is caused mainly by evaporation of the solvent, and accordingly, due to movement of the solvent towards the surface of the silica gel particles, the silica gel particles are likely to have hollows, and depressions and cracks are likely to form. On the other hand, in the present invention, a liquid mixture of an alkali silicate solution and an acid solution is sprayed to obtain droplets, and silicic acid obtained by hydrolysis of the alkali silicate undergoes polymerization for gelation. This process involves substantially no change in volume, whereby the spherical silica gel particles are less likely to have hollows, and formation of depressions and cracks will be suppressed.

In a case where an alkali silicate solution and an acid solution are preliminarily mixed and supplied, part of silicic acid in the alkali silicate undergoes polymerization before spraying, whereby there is a fear that uniformity of the mixing may be impaired, and the silica may undergo gelation and deposit on the supply portion. Accordingly, it is necessary to mix the solutions and spray the mixture under conditions under which the gelation does not substantially proceed before the spraying. On the other hand, it is preferred that the gelation proceeds rapidly after the spraying. In the present invention, the droplets obtained by spraying the liquid mixture are brought into contact with a liquid for recovering a silica gel to recover the formed spherical silica gel, whereby a uniformly spherical silica gel can be produced efficiently and stably for a long period of time, even when the solutions are mixed and sprayed under conditions under which the gelation does not substantially proceed before the spraying.

In the present invention, the gelation rate is adjusted by appropriately adjusting e.g. the temperature, the concentration, pH and the concentration of coexisting salts of the alkali silica solution and the acid solution, and selection of e.g. the spraying apparatus and spraying conditions thereof contributes to the adjustment of the gelation rate.

As the liquid for recovering a silica gel, preferred is water or an aqueous solution. Water containing substantially no solute such as deionized water may be used, but a solution of an acid such as sulfuric acid, or a solution of a hydrogen carbonate or a carbonate of an alkali metal or an alkaline earth metal, is preferred in view of an effect to accelerate gelation due to the pH of the spherical silica gel slurry. As the aqueous solution to be used with this purpose, particularly preferred is an aqueous acid solution such as a dilute aqueous solution of sulfuric acid or hydrochloric acid, or an aqueous sodium hydrogencarbonate solution.

As the alkali silicate to be used in the present invention, preferred is a sodium silicate, and sodium silicates comprising silicic acid and sodium with various molar ratios can be available depending upon the desired properties of the silica gel. Specifically, preferred is one having a $SiO_2/Na_2O$ molar ratio of from 2.0 to 3.4. In the alkali silicate solution, the silicic acid concentration is preferably from 5 to 30 mass % as calculated as $SiO_2$.

The acid to be mixed with the alkali silicate solution is not particularly limited, but sulfuric acid is preferred. The concentration of the acid solution is preferably from 10 to 30 mass %.

The alkali silicate solution and the acid solution are preferably such that a liquid obtained by mixing them has a pH of from 4 to 10. If the pH is less than 4 or exceeds 10, the gelation tends to take long, and the droplets are likely to be in contact with the wall or the bottom of a container accommodating the spraying apparatus before the droplets undergo gelation sufficiently, whereby the silica gel particles are likely to bond to one another to form agglomerates, or the yield of the spherical silica gel tends to decrease.

The alkali silicate solution and the acid solution before the mixing are supplied preferably at a temperature of at most 15° C. If the temperature of the alkali silicate solution or the acid solution exceeds 15° C., the gelation time tends to be short, whereby the gelation may take place on the contact surface, and scales may form.

In the present invention, the alkali silicate solution and the acid solution are preliminarily mixed before they are supplied to the spraying apparatus. The liquid mixture is prepared so as not to undergo gelation before it is sprayed by the spraying apparatus to obtain droplets, and the solutions are mixed in a supply tank to prepare the liquid mixture, which is supplied to the spraying apparatus by a supply tube. Here, it is usually preferred to carry out mixing quickly, and it is preferred to carry out the mixing immediately before the liquid mixture is supplied to the spraying apparatus. Accordingly, it is efficient to transport the alkali silicate solution and the acid solution by separate pipings to a portion in the vicinity of the spraying apparatus, and to mix them by a mixer before they are supplied to the spraying apparatus.

The temperature in an atmosphere in which the liquid mixture is sprayed by the spraying apparatus to obtain droplets is preferably at least 20° C. If the temperature in the atmosphere is less than 20° C., the droplets will be in contact with the wall or the bottom of the container accommodating the spraying apparatus before the droplets undergo gelation adequately, whereby there is a fear that silica gel particles are bonded to one another to form agglomerates, or the yield of the spherical silica gel may decrease.

It is preferred to supply a liquid for recovering a silica gel so that the droplets will contact the recovery liquid after the droplets undergo gelation. For example, the recovery liquid may be permitted to flow down from the upper part of a container to form a curtain of the recovery liquid at an area where the spherical silica gel reaches, so as to bring the spherical silica gel into contact with the recovery liquid. As a preferred method, the recovery liquid is permitted to flow down along the inner wall of a container accommodating the spraying apparatus to recover the spherical silica gel, whereby the spherical silica gel can be recovered as a slurry without being in direct contact with the inner wall of the container. The recovered slurry is concentrated by a thickener or subjected to solid-liquid separation by means of a centrifugal machine or a belt filter, followed by drying to obtain a spherical silica gel.

In FIG. 1 is illustrated one example of a silica gel production apparatus to be suitably used in the present invention. In FIG. 1, reference symbol A designates a spraying apparatus, and reference symbol B designates an accommodation container. The spraying apparatus A is provided on the upper part of the accommodation container. The droplets 1 sprayed fly and form a silica gel, and flow down along the inner wall 2 of the container B together with a liquid 3 for recovering a silica gel. The liquid for recovering a silica gel is supplied from a supply port 5 formed on a supply tube 4 which is installed at the upper part of the container. Here, numeral 6 designates a slurry to be recovered.

As the spraying apparatus to be used in the present invention, various ones are available. However, particularly preferred is a spraying apparatus of rotating disc type, which will be explained in further detail below.

The spraying apparatus of rotating disc type preferably comprises two discs connected to each other so that the liquid mixture of an alkali silicate solution and an acid solution is sprayed between the two discs so as to obtain the droplets in a short period of time. Such a type of rotating discs is commonly called a multiblade rotating disc.

Figure 2:
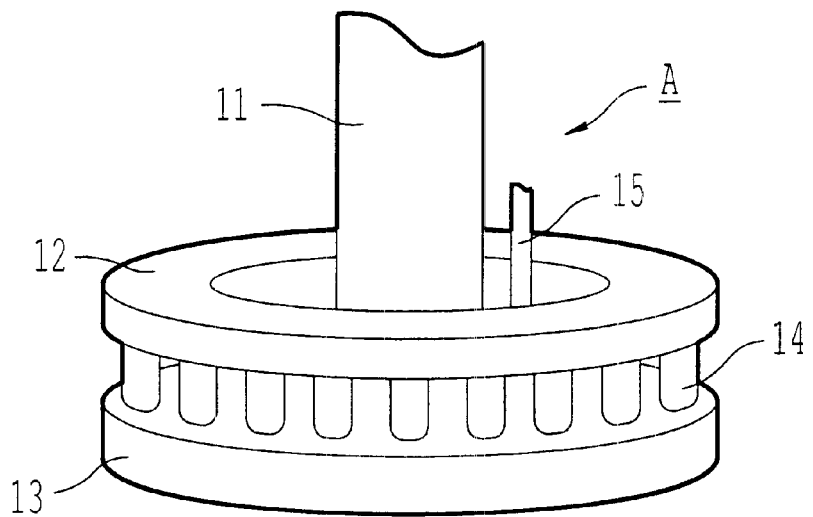
FIG. 2 is a perspective view illustrating one example of rotating discs to be used in the present invention as one of the preferred embodiments.

In FIG. 2 is illustrated one example of rotating discs to be suitably used in the present invention. In the spraying apparatus A of rotating disc type illustrated in FIG. 2, a disc 13 is attached at the tip of a rotating shaft 11, and a disc 12 is attached to the disc 13 by means of a large number of connecting pins 14. The disc 12 has a hole at the center portion, and the rotating shaft 11 is passed through the hole.

Namely, the rotating shaft 11, the disc 12, the disc 13 and the connecting pins 14 are fixed one on another, and they rotate with rotation of the rotating shaft 11. In FIG. 2, the connecting pins 14 are in a cylindrical form, but the connecting pins 14 may have various shapes of e.g. a prism or a plate.

Through the hole in the disc 12, a tube 15 for supplying the liquid mixture of an alkali silicate solution and an acid solution is passed so as not to be in contact with the rotating shaft 11 and the disc 12, to supply the liquid mixture to a space between the disc 13 and the disc 12. The tube 15 for supplying the liquid mixture is connected with a mixer (not shown) or a mixing tank for an alkali silica solution and an acid solution, upstream thereof.

The liquid mixture is supplied to a space between the rotating shaft 11 and the disc 12, and sprayed between the connecting pins 14 outwardly to obtain droplets. On the inside of the connecting pins 14, a plurality of pins for mixing may further be provided, whereby the alkali silicate and the acid may be mixed more uniformly.

On the rotating discs, part of the liquid mixture may undergo gelation to form scales in some cases. Due to scales, it tends to be difficult to produce a spherical silica gel stably for a long period of time. Formation of scales can be suppressed by changing e.g. the temperature, the concentration, the mixing ratio or the concentration of coexisting salts of the alkali silicate solution, the acid solution and the liquid mixture thereof to adjust the gelation rate.

Further, it is also preferred to employ a material made of a fluoroplastic such as a polytetrafluoroethylene (hereinafter referred to as PTFE) for an area in the rotating discs to be in contact with the liquid mixture, or to coat said area with a fluoroplastic.

The spherical silica gel obtained by the present invention contains a salt formed by reaction of the alkali silicate and the acid, and it is preferred to remove the salt by washing. The washing method is not particularly limited. For example, it is preferred to form a filter cake layer of the spherical silica gel on the surface of a filter fabric, and to wash out water-soluble impurities by e.g. centrifugal filtration, vacuum filtration or filtration under pressure, while supplying washing water to the layer.

Further, it is also preferred to dilute the filter cake with water again to obtain a slurry, followed by adequately stirring, and to repeat the filtration operation once or several times to remove impurities.

Water to be used for washing is not particularly limited, but e.g. running water, deionized water or demineralized water may be used, taking e.g. the purity of the final product or the acceptable amount of impurities into consideration. Further, the method of using water in this case is not particularly limited, and a method of using demineralized water alone, or a method of using running water at first and using deionized water at last half in view of cost, may optionally be selected.

After the washing, the spherical silica gel is dried, and subjected to a calcination treatment as the case requires. Further, an aging treatment may be carried out at an appropriate stage in the production process, with a purpose of e.g. controlling the pore characteristics.

As a drying method, a known method may be employed. Preferred is airborne drying, freeze-drying or supercritical drying so as to prevent shrinkage of pores during drying. It is also preferred to dry a slurry having spherical silica gel particles dispersed in water, by spray drying, whereby a spherical silica gel having a large pore volume can be obtained. Further, water may be replaced, before drying, with an organic solvent such as an alcohol having compatibility with water and having a low surface tension, whereby shrinkage of pores during drying can be prevented.

By the production process of the present invention, a spherical silica gel having an average particle size of preferably from 1 to 100 $\mu$m can be obtained. More preferred range of the average particle size is from 30 to 100 $\mu$m.

The characteristics of the spherical silica gel obtained by the production process of the present invention can be controlled by adjusting the temperature, the concentration, the mixing ratio or the concentration of coexisting salts of the alkali silicate solution, the acid solution and the liquid mixture thereof, or by an aging treatment. According to the production process of the present invention, a spherical silica gel having a pore volume of from 0.01 to 3.0 cm$^3$/g, a specific surface area of from 1 to 1,000 m$^2$/g and a compressive strength of particles of from 10 to 100 MPa can be suitably produced.

In a conventional process for producing a spherical silica gel by a spray granulation, a silica sol or an alkali silicate solution is sprayed to obtain droplets, and the droplets are heated for gelation. In such a case, the gelation is caused mainly by evaporation of the solvent, and accordingly, due to movement of the solvent towards the surface of the silica gel particles, the silica gel particles are likely to have hollows, and depressions and cracks are likely to form. On the other hand, in the present invention, the gelation is due to neutralization of the alkali silicate and polymerization of silicic acid. This process involves substantially no change in volume, whereby the spherical silica gel particles are less likely to have hollows, and formation of depressions and cracks will be suppressed.

The spherical silica gel of the present invention after gelation is a hydrogel, as evaporation of a solvent is not involved, and an optional desired pore volume will be obtained by carrying out an aging treatment at an appropriate stage in an after-processing.

With respect to the spherical silica gel obtained by the present invention, from its properties, the droplet size distribution of sprayed droplets can be controlled by spray granulation employing rotating discs, and the particle size distribution of the silica gel particles thus obtained will be sharp.

The spherical silica gel particles obtained by the production process of the present invention have a uniform particle size and a shape close to a sphere. Accordingly, they can be preferably used, for example, for a medium for liquid chromatography.

Now, the present invention will be described in further detail with reference to Examples. However, it should be understood that the present invention is by no means restricted to such specific Examples.

EXAMPLE 1

1,835.4 g of an aqueous sodium silicate solution having a SiO$_2$ concentration of 5.3 mass % and a SiO$_2$/Na$_2$O molar ratio of 3.0, and 258.2 g of an aqueous sulfuric acid solution of 20.0 mass %, were rapidly mixed to prepare a liquid mixture of sodium silicate and sulfuric acid. This liquid mixture had a pH of 4.8 and a viscosity of 20 cP.

This liquid mixture was supplied to the center portion of rotating discs of a spray dryer of rotating disc type as shown in FIG. 2, and sprayed for granulation. As the spray dryer, a production minor spray dryer manufactured by Niro Japan was used. As the operation conditions of the spray dryer, the hot air flow was 110 m$^3$/h, the temperature at the inlet of hot air was 250° C., and the temperature at the outlet of hot air was 110° C. The rate of supply of the liquid mixture was 70 cm$^3$/min. With respect to the rotating discs used, the area which will be in contact with the liquid mixture was coated with PTFE, the diameter was 100 mm and the rotational speed was 12,000 rpm.

The spray dryer was provided on the uppermost portion of a container (diameter: 1.4 m, height: 0.8 m). As a liquid for recovering a spherical silica gel, an aqueous sodium hydrogencarbonate solution of 5 mass % was sprayed from the upper part of the inside of the container, and the aqueous sodium hydrogencarbonate solution was permitted to flow down along the inner wall of the container to form a wetted wall. This aqueous solution caught the particles which reached the wall, and the spherical silica gel was recovered as a slurry. This slurry had a pH of 8.0 and a solid content concentration of 0.1 mass %.

Then, sulfuric acid was added to the slurry to adjust the pH to be 6.0, followed by heating at 60° C. for 1 hour to carry out an aging treatment. This slurry was subjected to solid-liquid separation, and a cake thus obtained was washed with deionized water in an amount of 100 times the solid content, followed by drying with a spray dryer, to obtain a spherical silica gel.

This spherical silica gel had a pore volume of 0.66 cm$^3$/g, a specific surface area of 470 m$^2$/g, an average particle size of 48.0 $\mu$m and a compressive strength of 21 MPa. Here, the pore volume and the specific surface area of the spherical silica gel were measured by AUTOSORB 3B, tradename, manufactured by YUASA IONICS. The average particle size was measured by MICROTRAC HRA-X100, tradename, manufactured by Nikkiso Co., Ltd. The compressive strength was measured by a microcompression testing machine MCTM-500 manufactured by SHIMADZU CORP., by selecting particles having substantially the same particle size as the average particle size.

Further, the appearance of the spherical silica gel particles was observed by a scanning electron microscope to confirm that the particles have no depression or crack on the surface. With respect to the structure in the inside of the spherical silica gel particles, the particles were confirmed to be solid in such a manner that the silica gel particles were embedded and fixed in an epoxy resin, a sample having a thickness of 0.1 μm was prepared by a microtome, and a section of the sample was observed by an optical microscope. It was observed that a spherical silica gel having hollows obtained by another method had space in the inside of the particles, and particles having hollows and particles being solid could be clearly distinguished by observation using an optical microscope by transmitted light.

With respect to the obtained spherical silica gel particles, particles having particle sizes within a range of from 40 to 63 μm alone were separated by using a sieve. The spherical silica gel particles were packed in a column having an inner diameter of 50 mm and an effective length of 200 mm, to prepare a column for liquid chromatography.

A developer (normal hexane: 90 vol %, dioxane: 10 vol %) was made to flow through the column at a flow rate of 50 cm$^3$/min, and liquid chromatographs of anisole and orthonitroanisole were measured (detection wavelength: 254 nm). The number of theoretical plates was 5,500 plates/m.

When a silica gel in a crushed shape having particle sizes of from 40 to 63 μm, a pore volume of 0.77 cm$^3$/g and a specific surface area of 561 m$^2$/g (LiChroprep Si60, tradename, manufactured by Kanto Chemical Co., Inc.) was used to carry out measurements under the same conditions, the number of theoretical plates was 3,200 plates/m. It was confirmed that performances of the liquid chromatography had improved by making the shape spherical.

EXAMPLE 2

Comparative Example

The liquid mixture used in Example 1 was subjected to spray granulation by a spray dryer of rotating disc type. The conditions for operation of the spray dryer were the same as in Example 1. Further, the rotating discs used were the same as used in Example 1, and operation was carried out under the same conditions. However, no liquid for recovering a spherical silica gel was sprayed.

Most of the spherical silica gel sprayed and granulated attached to the wall of a dry container, and only a small amount thereof was recovered. The recovered gel was observed by a microscope, whereupon irregular spherical particles and agglomerates of irregular particles were observed.

According to the production process of the present invention, solid spherical silica gel particles having no depression or crack on the surface, can effectively be produced with a compact equipment. The gelation rate can be adjusted by controlling e.g. the temperature, the concentration, the mixing ratio or the concentration of coexisting salts of an alkali silicate solution or an acid solution, by controlling conditions for an aging treatment, or by selecting appropriate spray conditions, and the physical properties of the spherical silica gel particles can also be adjusted.

With respect to the spherical silica gel to be obtained, mechanical strength of the particles is high, and pore characteristics can readily be adjusted. Accordingly, the spherical silica gel can be preferably used for e.g. a catalyst, a catalyst support, a pigment for cosmetics, a medium for column chromatography, a resin filler, an adsorbent, a drying agent, a weight saving material, a dielectric constant-lowering filler, a heat insulating material or a soundproof material.

What is claimed is:

1. A process for producing a spherical silica gel, which comprises supplying a liquid mixture resulting from mixing of an alkali metal silicate solution and an acid solution to a spraying apparatus, spraying the liquid mixture to obtain droplets, bringing the droplets into contact with a liquid for recovering a silica gel, said liquid for recovering a silica gel being sprayed from an upper part of a container accommodating the spraying apparatus and permitted to flow down along an inner wall of said container, and recovering the formed spherical silica gel together with the liquid for recovering a silica gel, as a slurry.

2. The process for producing a spherical silica gel according to claim 1, wherein the spraying apparatus is of rotating discs comprising two rotating discs connected to each other, and the liquid mixture is sprayed between the two rotating discs.

3. The process for producing a spherical silica gel according to claim 1, wherein the liquid for recovering a silica gel is an aqueous sodium hydrogencarbonate solution or an aqueous acid solution.

4. The process for producing a spherical silica gel according to claim 1, wherein the alkali metal silicate solution and the acid solution are supplied respectively at a temperature of at most 15° C.

5. The process for producing a spherical silica gel according to claim 1, wherein the alkali metal silicate is sodium silicate having a silicic acid concentration of from 5 to 30 mass % as calculated as $SiO_2$.

6. The process for producing a spherical silica gel according to claim 1, wherein the acid to be mixed with the alkali metal silicate solution is sulfuric acid having a concentration of from 10 to 30 mass %.

7. The process for producing a spherical silica gel according to claim 1, wherein the liquid having the alkali metal silicate solution and the acid solution mixed has a pH of from 4 to 10.

8. The process for producing a spherical silica gel according to claim 1, wherein the temperature in an atmosphere in which the liquid mixture is sprayed to obtain droplets by the spraying apparatus is at least 20° C.

* * * * *